United States Patent [19]
Balogh et al.

[11] Patent Number: 5,734,830
[45] Date of Patent: Mar. 31, 1998

[54] MULTI-EQUIPMENT ROUTING METHOD AND MASTER STATION FOR LAYERED PROTOCOL COMMUNICATION NETWORK SYSTEM

[75] Inventors: Ray Balogh, Toronto; Michael E. Vitez; Luc Gadbois, both of Mississauga, all of Canada

[73] Assignee: Motorola, Inc., Schaumburg, Ill.

[21] Appl. No.: 497,963

[22] Filed: Jul. 3, 1995

Related U.S. Application Data

[63] Continuation of Ser. No. 876,605, Apr. 30, 1992, abandoned.

[51] Int. Cl.$^6$ ........................................ H04L 12/403
[52] U.S. Cl. ........................ 395/200.38; 395/200.55; 395/200.66; 395/290; 340/825.06
[58] Field of Search ................ 395/200.05, 200.06, 395/200.12, 200.13, 200.14, 200.16, 200.17, 200.18, 200.19, 835, 836, 885, 890, 290, 500, 800; 340/825.06; 370/85.1

[56] References Cited

U.S. PATENT DOCUMENTS

| | | | |
|---|---|---|---|
| 4,079,452 | 3/1978 | Larson et al. | 395/831 |
| 4,188,664 | 2/1980 | DeShon | 395/831 |
| 4,346,452 | 8/1982 | Groves | 395/831 |
| 4,608,689 | 8/1986 | Sato | 395/200.1 |
| 4,648,061 | 3/1987 | Foster | 395/200.1 |
| 4,726,017 | 2/1988 | Krum et al. | 370/85.8 |
| 4,734,853 | 3/1988 | Nakano | 395/831 |
| 4,855,905 | 8/1989 | Estrada et al. | 395/500 |
| 4,891,783 | 1/1990 | Aritana et al. | 395/200.1 |
| 4,954,983 | 9/1990 | Klingman | 395/831 |
| 4,975,830 | 12/1990 | Gerpheide et al. | 395/200.01 |
| 5,021,949 | 6/1991 | Morten et al. | 395/200.09 |
| 5,072,441 | 12/1991 | Seware | 370/60 |
| 5,113,497 | 5/1992 | Dewa | 395/236 |
| 5,121,482 | 6/1992 | Patton | 395/836 |
| 5,146,572 | 9/1992 | Bailey et al. | 395/200.01 |
| 5,167,021 | 11/1992 | Needham | 395/836 |
| 5,175,820 | 12/1992 | Gephardt | |
| 5,195,181 | 3/1993 | Bryant et al. | 395/200.1 |
| 5,274,767 | 12/1993 | Maskovyak | 395/836 |
| 5,317,568 | 5/1994 | Bixby et al. | 370/85.6 |
| 5,317,695 | 5/1994 | Celi, Jr. | 395/836 |

OTHER PUBLICATIONS

Cypser, R.D. Communications for Cooperating Systems OSI, SNA, and TCP/IP, Addison–Wesley, pp. 672–674 1991.
"4.4.2.3 Use of an inherent X.25 subnetwork 1980 version", Standards for Open Systems Interconnection, McGraw Hill, Knightson, K.G., Knowles, T., Larmount, J., pp. 93–95.
"3.4. Ethernet and IEEE 802", RFC 1009–Requirements for Internet Gateways, Braden & Postel, Jun. 1987, pp. 27–28.
"Ethernet Numbers of Interest", IRFC 1060 Assigned Numbers, Reynolds & Postel, Mar. 1990, p. 35.
"X.25 Packet Switching".
"Link Header (address)", Chapter 1, DLC Links, Fig. 1–3.

*Primary Examiner*—Lance Leonard Barry, Esq.
*Attorney, Agent, or Firm*—Darleen J. Stockley

[57] ABSTRACT

The multi-equipment routing method (700) and master station (400) include customized virtual ports that are selected by a polling unit in accordance with a link address header that identifies a matched secondary station to which the data message is to be delivered such that a network equipment type (NET) is also automatically identified. The routing method and master station provide for customizing functions typically found in layers 1–3 of the open systems interconnections OSI model such that a communication may occur between network of different equipment types, such as systems network architecture-type (SNA-type) and non-SNA type equipment.

23 Claims, 5 Drawing Sheets

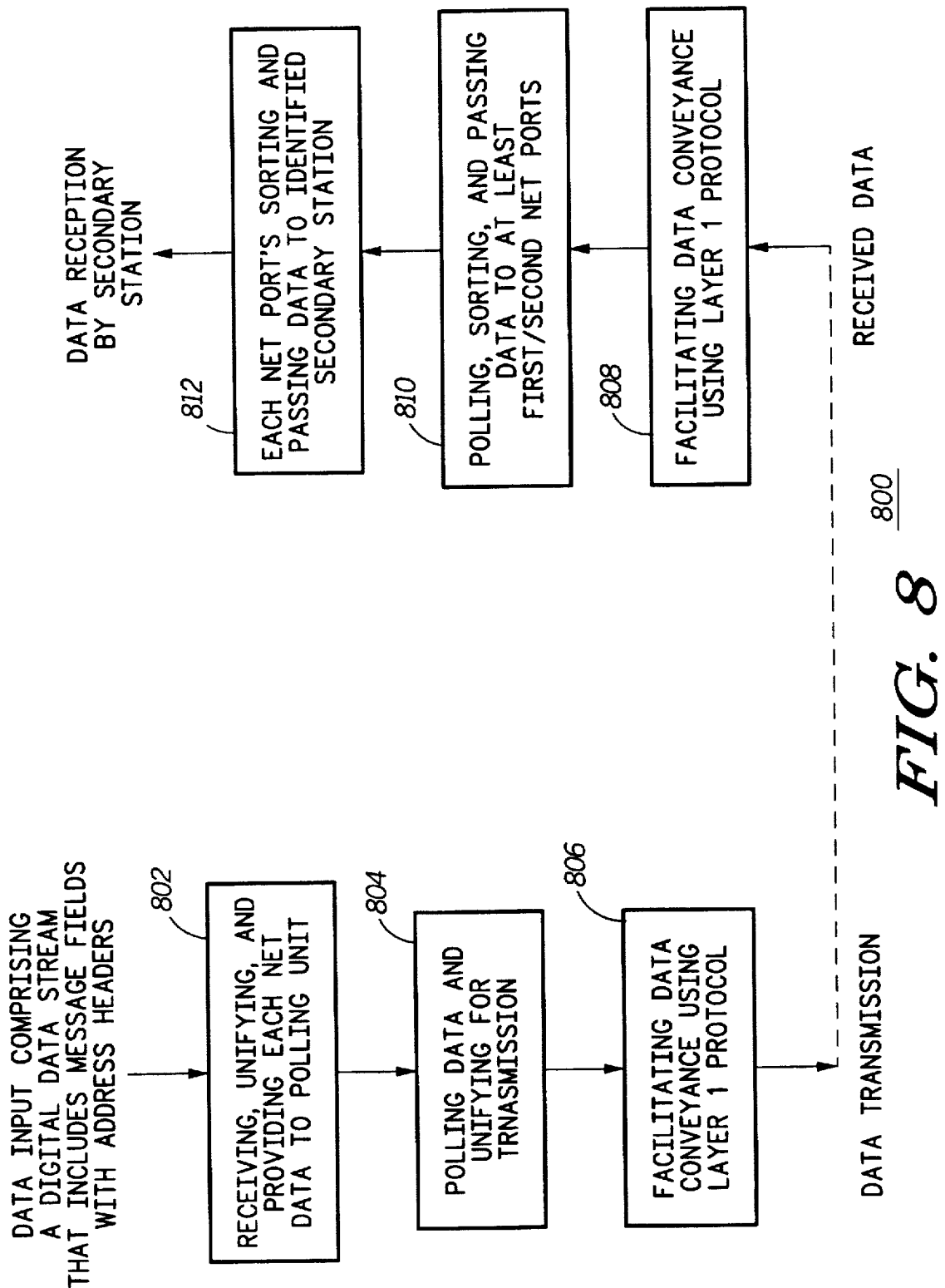

MULTI-EQUIPMENT ROUTING METHOD AND MASTER STATION FOR LAYERED PROTOCOL COMMUNICATION NETWORK SYSTEM

This is a continuation of application Ser. No. 07/876,605, filed Apr. 30, 1992 and now abandoned.

FIELD OF THE INVENTION

The present invention relates to layered protocol communication network systems, and more particularly to communication network systems having secondary stations of different equipment types.

BACKGROUND

Since the mid 1970's the creation and storage of computer data has become less expensive, and computer operation has been made to seem less complex to the user, that is, has become more transparent. Thus, there has been a large increase in the number of computer users. With the increase in the number of users has come the need for communication between users via computer. Computer networks have been developed to fill this need.

With the development of computer networks, various point-to-point connection systems for computers on networks have evolved, and certain data transfer protocols have been formulated. Most such data transfer protocols utilize a stack of layered protocols to describe the range of functions employed to provide data transfer.

In 1983 the International Organization for Standardization set forth an open systems interconnection model (OSI model) that was intended to define the functions of the protocol layers while not setting forth the layer protocols themselves. The seven layered OSI model, set forth in FIG. 1, numeral 100, is a model to which modern protocols are expected to conform. As is known in the art, the seven layers are application (102, 128), presentation (104, 126), session (106, 124), transport (108, 122), network (110, 120), data link (112, 118), and physical (114, 116), respectively. For communication, information starts at the top (102) of one stack of functions, is sequentially converted by each function (104, 106, 108, 110, and 112) in the stack, and in the physical layer (114) is changed to means for transmitting data. The data link layer (112, 118) typically includes a standard datalink protocol such as a high level data link control (HDLC). In the physical layer (114, 116), for example, data bits may be changed into modem tones, electrical signals, or optical signals. The transmitted data travels up the second stack of functions (116, 118, 120, 122, 124, 126, and 128) in a reverse order to that of the first stack, thus supplying the information to a selected destination. Thus, in FIG. 1, actual communication is shown by direct connection of the physical layers (114, 116) of two stacks, and communication at higher levels of the stacks, indicated by dashed arrows, is accomplished by relying on lower level conversions.

The principle of layered protocols is that layers interact in a peer-to-peer (i.e., n-level to n-level) manner, and the functions of each individual layer are carried out without affecting the interface between the function of the individual layer and the layers immediately above and below it.

In practice, many computer manufacturers divide the functions such that the layers 1-3 are implemented by a "front end" or "communication controller," and the layers 4-7 are implemented by a "host." Thus, link supervision and synchronization, error correction, and conversion of data format from an internal computer bus format to a standard serial transmission line format take place within the "communication controller." The "host" computer typically has a main computer software program that relies on an application program (level 7) that cooperates with a peer-to-peer corresponding protocol (level 7) in another terminal that provide, for example, "read" or "print" functions. Layers 1-3 often may be implemented at the "host" end by a "communication controller" located at or near the "host."

In 1974, prior to the development of the OSI model, IBM (International Business Machines) introduced a "system network architecture" (SNA) for all-purpose data networks having a layered function set in which, in contrast to the OSI model, protocols were specified for each layer. FIG. 2, numeral 200, illustrates that the SNA network system provided for communication between logical units (LUs), which were software programs residing within physical units (PUs) such as terminals and computers. SNA utilized at least seven layers (also termed "levels") to serve the LUs at each end of a SNA network, being described from the top of the stack downward: a NAU (Network Addressable Unit) services for data exchange between logical units (LUs) (202, 228) (like level 7); FMD (File Management Data) services for syntax, data compression and compaction type, ASCII and EBCDIC code type (204, 226) (like level 6); data flow control for dialogue (session) control (206, 224) (like level 5); transmission control for activating and deactivating data flow within a session (208, 222) (like level 4); path control for routing and flow control (210, 220) (like levels 2 and 3); datalink control for managing bit-oriented data flow (Synchronous Data Link Control, SDLC, being a best known such protocol) (212, 218) (like level 2); and physical for actual communication, typically X.21 used in conjunction with a digital access line (214, 216) (like level 1).

SNA, as does the OSI model, typically provides that each progressively lower layer adds an information field to original data, which is progressively removed as the information passes up the layers of the receiving stack protocols. This arrangement allows for modular design of network hardware. The layers themselves may be implemented in numerous forms. In some cases the layers are all realized in a same PU. Alternatively, the lowest three layers may comprise a control network path implemented by a network control program of a communications controller (i.e., front end processor) and the higher layers may form a network addressable unit that is implemented in software within a host processor.

A typical SNA network, illustrated in FIG. 3, numeral 300, comprises four physical units: a host computer (302) having at least a first application program (310) and a telecommunications software product, generally Virtual Telecommunications Access Method (314) (VTAM, a method that includes system services control point SSCP for controlling overall network configuration by activating and deactivating the network and establishing communication sessions) utilized by a logical unit (312); a network controller (304), typically being a network control programmer (NCP)(316); a cluster controller (306); and a terminal node (308) having at least a first logical unit (318). The SNA network may support a variety of session types, i.e., may be utilized to support various types of sessions for IBM (International Business Machine) and IBM-compatible users.

While the above-described system provides equipment that operates well utilizing SNA based SDLC line protocol, such a system does not provide for LU or secondary station communication wherein a combination of SNA data traffic and non-SNA data traffic are transmitted along a same physical multi-drop line to SNA and non-SNA LUs. Present technology has advanced to a point where it is common for different users to have different types of data traffic network equipment systems, and yet, have a need to communicate. Clearly, there is a need for an apparatus and method that provide for secondary station communication wherein a combination of SNA data traffic and non-SNA data traffic are transmitted along a same physical multi-drop line to SNA and non-SNA secondary stations.

SUMMARY OF THE INVENTION

The present invention includes a method for implementing and a multi-equipment routing master station for facilitating digital data stream transmission/reception, wherein the digital data stream includes message fields, in a layered protocol communication network system having a multi-drop transmission line operably coupled to secondary stations of at least a first and a second different network equipment type (NET). The said master station comprises at least: (1) layer one (1) protocol unit, operably coupled to receive/transmit data along a transmission line, for facilitating data conveyance, (2) a polling unit, operably coupled to transmit/receive data to/from the layer one protocol unit, for utilizing at least a first selected message field to determine the NET and for unifying/sorting data from/to at least first and second port means that are responsive to at least first and second NET secondary stations for respective NETs utilizing further protocol layers, (3) the first port unit, being responsive to the polling unit and to further protocol layers for a first respective NET, for utilizing a first data link control protocol to unify/sort transmitted/received data from/to the first NET secondary station(s), and (4) the second port unit, operably coupled to the polling unit and to further protocol layers for a second respective NET, for utilizing a second data link control protocol to unify/sort transmitted/received data from/to the second NET secondary station(s).

BRIEF DESCRIPTIONS OF THE DRAWINGS

FIG. 8 is a flow chart setting forth the steps in accordance with the method of the present invention.

DETAILED DESCRIPTION OF PREFERRED EMBODIMENT

The present invention includes an apparatus (being a customized master station) and method that provide for secondary station communication wherein a combination of different network equipment types (for example, SNA and non-SNA) are used for transmitting data along a same physical multi-drop transmission line to their respective secondary stations.

As used herein, the terms "master station," "multi-drop transmission line," and "slave station" are intended to have the meanings set forth below. A "master station" (also termed a primary station) is a (single) station on a multi-drop transmission line that is assigned a task of controlling link procedures. A "multi-drop transmission line", also known as a "multi-point transmission line," is a physical transmission medium configuration in which a single master station is coupled to two or more slave stations. Only the master station and/or a single slave station can transmit at a given time. Two slave stations do not transmit simultaneously. A "slave station" (also termed a secondary station) is typically a data station that is selected by a master station to receive data.

Figure 1:
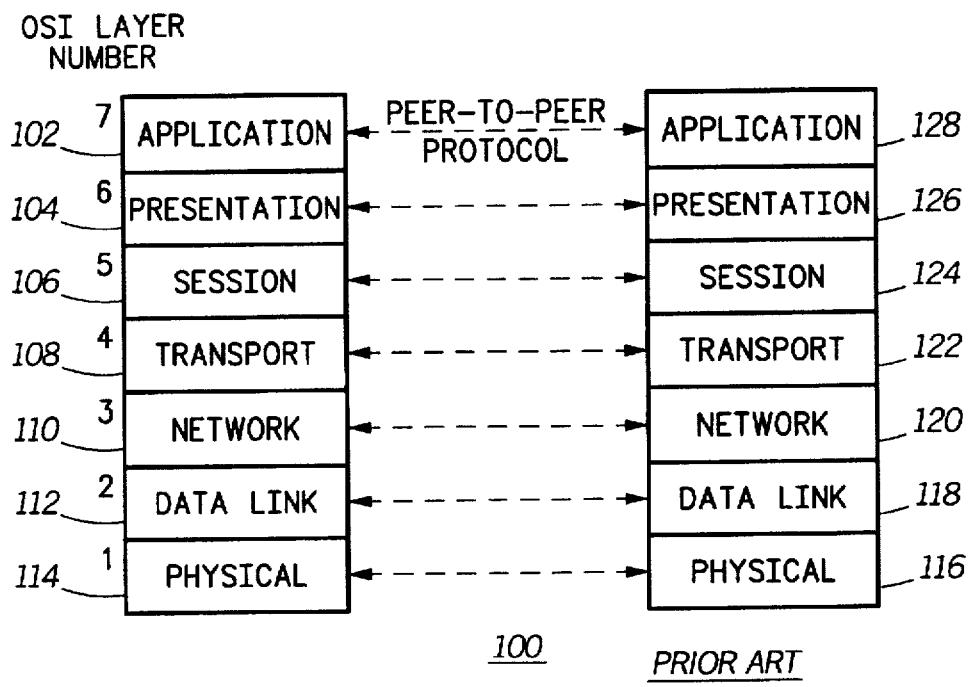
FIG. 1 is a block diagram of an Open Systems Interconnection (OSI) model for a communication network system as is known in the art.
Figure 2:
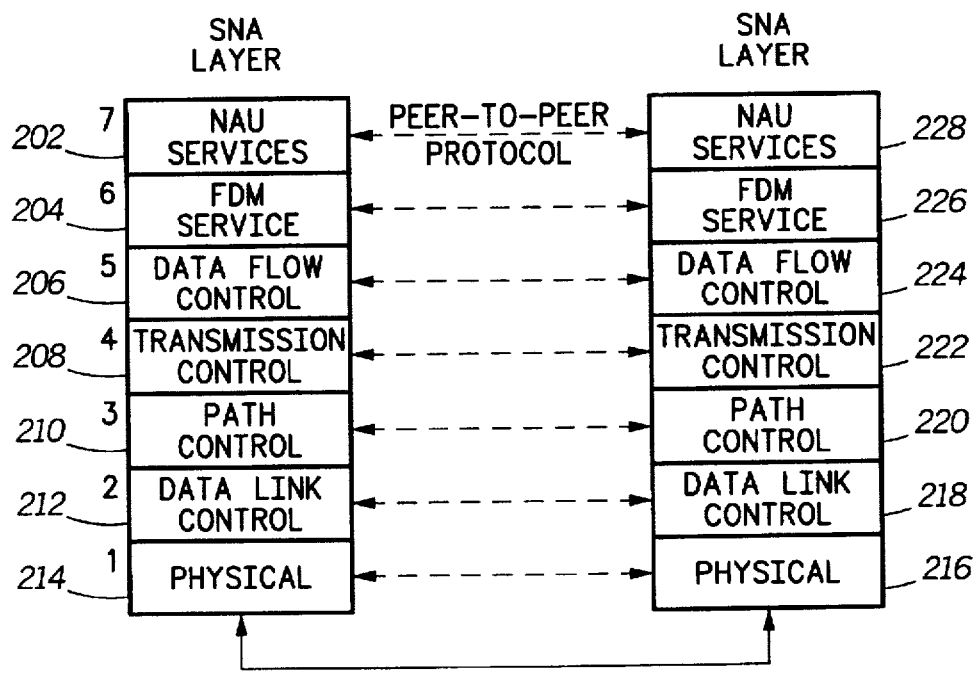
FIG. 2 is a block diagram of a System Network Architecture (SNA) model for a communication network as is known in the art.
Figure 3:
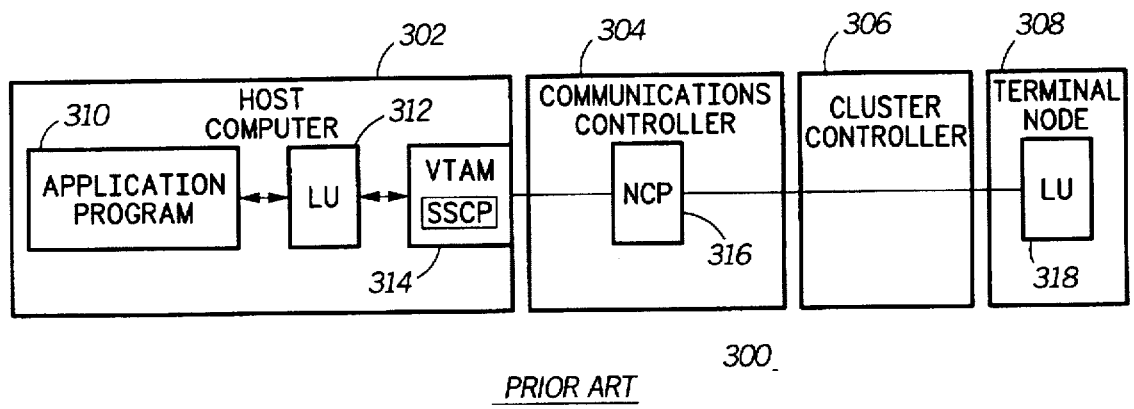
FIG. 3 is a block diagram of a typical SNA network as is known in the art.
Figure 4:
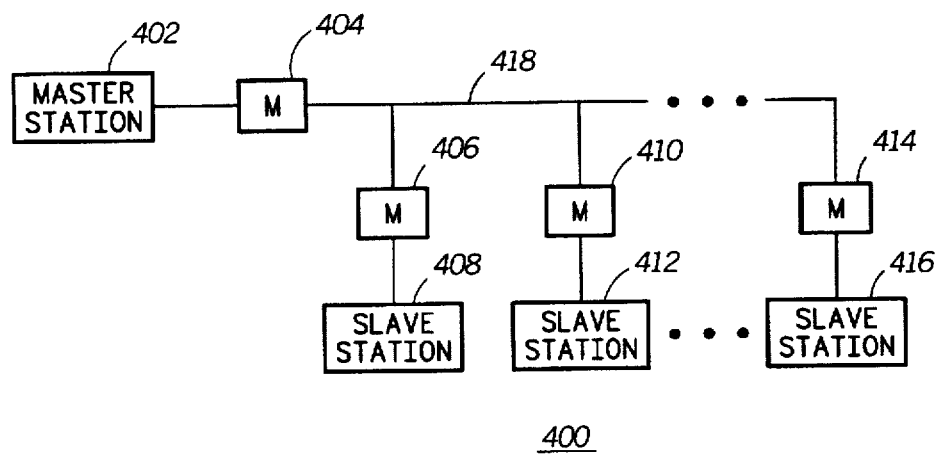
FIG. 4 is a block diagram illustrating a typical multi-drop transmission line operably coupling a master station and a plurality of slave stations as is known in the art.

FIG. 4, numeral 400, sets forth a block diagram illustrating a typical multi-drop transmission line (418) operably coupling a master station (402) and a plurality of slave stations (408, 410, 416, . . . ) as is known in the art. The multi-drop transmission line (418) typically utilizes a plurality of modems (404, 406, 410, 414, . . . ) such that said transmission line is operably coupled to a modem that is operably coupled to a master station/slave station, i.e., with a modem (404) servicing a master station (402) and modems (406, 410, 414, . . . ) servicing each of the drops to slave stations (408, 412, 416, . . . ).

Figure 5:
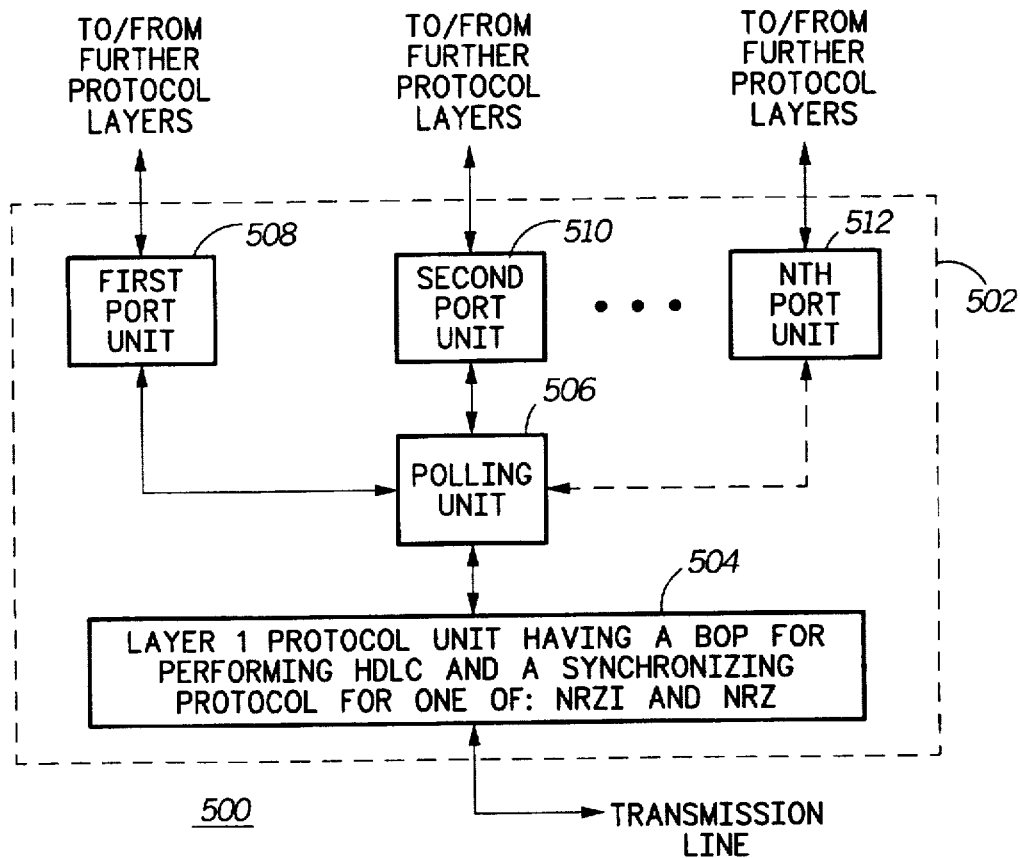
FIG. 5 is a block diagram of a first embodiment of a multi-equipment routing master station in accordance with the present invention.

FIG. 5, numeral 500, sets forth a block diagram of a first embodiment of a multi-equipment routing master station in accordance with the present invention. The multi-equipment routing master station (502) is provided for facilitating digital data stream transmission/reception in a layered protocol communication network system having a multi-drop transmission line operably coupled to secondary stations of at least a first and a second different network equipment type (NET). A typical digital data stream includes message fields, described further below. Communication network systems having layers (also termed levels) are described above. The master station includes a layer one (1) protocol unit (504), typically a protocol unit that utilizes a physical protocol suitable for use on a multi-drop transmission line, operably coupled to receive/transmit data along a transmission line, for facilitating data conveyance, and a polling unit (506), operably coupled to transmit/receive data to/from the layer 1 protocol unit (504). The polling unit (506) is operably coupled to a transmission line for utilizing at least a first selected message field to determine the NET and for unifying/sorting data from/to port units that are responsive to secondary stations through further protocol layers. The master station further includes at least a first port unit (508), responsive to the polling unit (506) and to further protocol layers, for utilizing a first data link control protocol to unify/sort transmitted/received data from/to the further protocol layers, and a second port unit (510), operably coupled to the polling unit (506) and to secondary further protocol layers, for utilizing a second data link control protocol to unify/sort transmitted/received data from/to the said further protocol layers. The number of port units is selectable, for example, up to an Nth port unit (512), where N is a preselected integer.

Typically layered protocol communication network systems utilize message fields, fields (often termed headers) being added to data information. Each protocol layer generally adds a header containing information for its use, causing the overall message to become longer as it proceeds down (from higher numbered layers to lower numbered layers). Since the headers contain the information each protocol needs to perform its function, the headers are typically stripped from the message as it moves up the layers at the receiving end such that the original message information is provided at the top protocol level of the receiving protocol stack.

The present invention substantially utilizes at least the layer 1 protocol unit (504), the polling unit (506), the first port unit (508), and the second port unit (510) to substantially provide a layer 1–3 System Network Architecture/ Open System Interconnection (SNA/OSI) protocol for the layered protocol communication network system. A first selected message field is generally selected to include a link address header for identifying a matched secondary station for the message, thus automatically identifying a network equipment type (NET).

Figure 6:
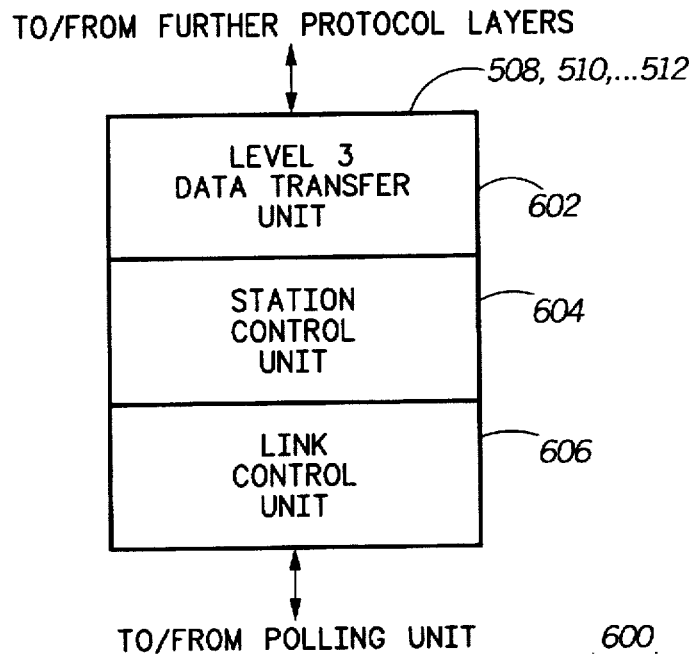
FIG. 6 is a block diagram of a port unit of the first embodiment of FIG. 4, setting forth greater detail.

Each NET has a port unit for handling data in accordance with a protocol stack associated with its NET. FIG. 6, numeral 600, is a block diagram of a port unit of the first embodiment of FIG. 5, setting forth greater detail of a port unit. A typical port unit (508, 510, 512, . . . ) includes a link control unit (606), a station control unit (604), and a level 3 data transfer unit (602). The link control unit (606) is responsive to the polling unit (506), for at least unifying/ sorting data from/to a predetermined station control block (not shown) of at least a first station control unit (604). The link control unit (606) typically utilizes a message field, e.g., an address header, to identify the predetermined station control block for a particular secondary station to which the message is being sent. The station control unit (604) typically includes at least a first station control block (not shown) responsive to the link control unit (606), for controlling transmission/reception of data to/from at least a first transfer unit block (not shown) of the level 3 data transfer unit (602) from/to the link control unit (606) of its NET. In general, the level 3 data transfer unit (602) includes at least a first transfer unit block (not shown) operably coupled to a corresponding station control block (not shown) of the station control unit (604) corresponding to the identified predetermined secondary station for transmitting/receiving data from the station control blocks of the station control unit (604) across a transmission medium to/from secondary stations of its NET.

The protocol of the present invention typically provides for at least one of: synchronizing transmitted/received data, controlling a flow of multi-drop transmission/reception line data, and detecting and correcting data transmission errors.

More than two different network equipment types (NETs) may be utilized in the present invention. Each additional different network equipment type (NET) beyond the first and second NET types transmitted/received on one multi-drop transmission line typically requires another port unit for each additional different NET, operably coupled to transmit/ receive said NET, for at least performing a data link control function for the NET such that data for each said different NET may be transported across a transmission medium to/from at least a first secondary station. For example, a CCITT (International Telegraph and Telephone Consultative Committee) Recommendation X.25 packet interface standard protocol, and an SNA procedure for transferring SDLC data across a transmission medium may be utilized separately by two virtual ports as protocols for data transmission/ reception across a transmission medium in accordance with the present invention.

Figure 7:
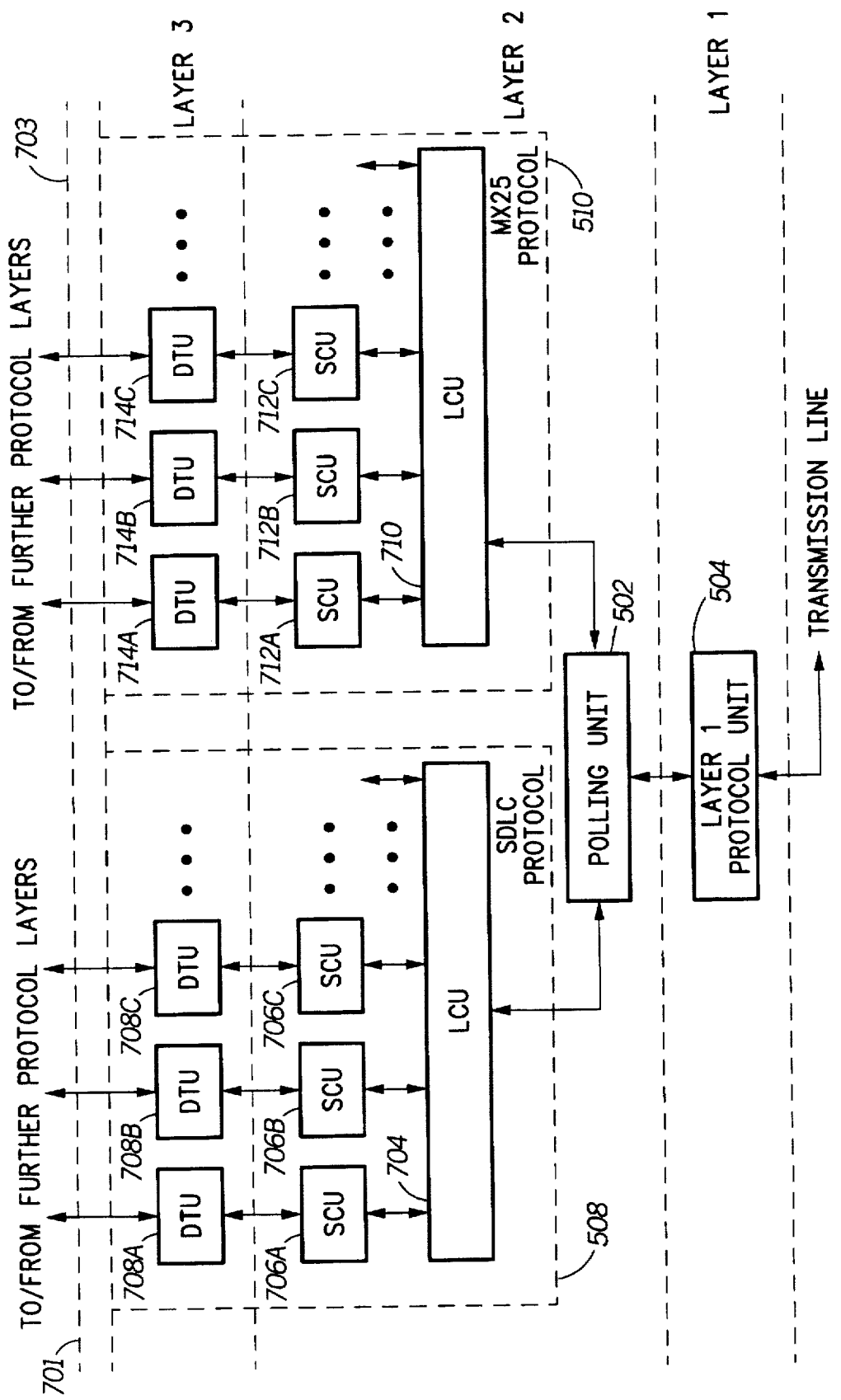
FIG. 7 is a block diagram of an exemplary embodiment of a multiequipment routing master station in accordance with the present invention.

In an exemplary embodiment, illustrated in FIG. 7, numeral 700, two port units (701, 703) are utilized as complete and independent virtual ports. Typically, in the exemplary embodiment, in a layered protocol network system a layer 1 protocol unit (504), typically having a bit-oriented protocol (BOP) for performing standard high level data link control (HDLC) handling of the data is operably coupled to a transmission line to transmit/receive data for the at least first and second NETs. The data is generally arranged in message fields, and the multi-equipment routing master station of the present invention utilizes a sequential protocol stack such that the polling unit (506) is responsive to the layered protocol layer 1 protocol unit (504) and utilizes a first message field to provide and identify a link address of the data and to route the data to a SDLC TPAD of the first port (701).

The link address header identifies the NET as a first NET or, alternatively, a second NET. In this embodiment the first port unit (701) is of the first NET and includes a synchronous data link control terminal packet assembler/ disassembler (SDLC TPAD), responsive to the polling unit (506) for passing data identified for the first NET to a matched (i.e., identified) SDLC data link secondary station. The SDLC TPAD typically includes a link control unit (LCU) (704), at least a first station control unit (SCU) (706A, 706B, 706C, . . . ), and at least a first SDLC transfer unit (708A, 708B, 708C, . . . ). The LCU (704) is operably coupled to the polling unit (506) to transmit/receive data for the first NET to/from the polling unit (506). The LCU (704) manages link level data flow and provides said data to at least a first station control block (SCU) (706A, 706B, 706C, . . . ). That is, for transmission of data, the LCU (704) unifies data from the SCUs for transmission to the polling unit (506), and for reception of data, the LCU sorts data from the polling unit (506) for transmission to the identified SCUs (706A, 706B, 706C, . . . ). The SCU intended for a particular data message is determined from the message field, i.e., address header, that identifies the predetermined SCU to receive the data. The SCUs (706A, 706B, 706C, . . . ) are operably coupled to receive data for the first NET from the LCU (704), for routing said data to a preselected secondary station utilizing at least a first SDLC transfer unit (708A, 708B, 708C, . . . ). The SDLC transfer unit(s) (708A, 708B, 708C, . . . ), being level 3 protocol unit(s), are operably coupled to transmit/receive data to/from the corresponding SCUs for each secondary station (typically utilizing further protocol layers) for the first NET and to transmit/receive data across the transmission medium.

In the exemplary embodiment, the second port unit (703) is of the second NET and includes a multi-point X.25 packet assembler/disassembler (MX.25 PAD), responsive to the polling unit (506) for passing data identified for the second NET to a matched (identified) MX.25 data link secondary station (X.25 compatible end-point equipment). The terminology "MX.25" is defined as a proprietary Motorola Codex protocol which provides the means to transport X.25 data traffic over a multi-drop transmission line. The MX.25 Master PAD typically includes a level 2 port control unit (LCU) (710), at least a first station control unit (SCU) (712A, 712B, 712C, . . . ), and at least a first X.25 transfer unit (DTU) (714A, 714B, 714C, . . . ). The LCU (710) is operably coupled to the polling unit (506) for transmitting/ receiving data for the second NET to/from the polling unit (506). The LCU (710) manages link level data flow and provides the said data to at least a first level 2 station control unit (SCU) (712A, 712B, 712C, . . . ). For data transmission, the SCUs unit(s) are operably coupled to transmit data for the second NET to the LCU (710) and, for data reception, to route said data to a preselected secondary station , typically identified by a message field, i.e., an address header. The X.25 transfer unit(s) (DTUs) (714A, 714B, 140, ...), being level 3 protocol unit(s), are operably coupled to transmit/receive data to/from the corresponding SCUs (712A, 712B, 712C, ...) for each secondary station (typically utilizing further protocol layers) for the second NET and to transmit/receive data across the transmission medium. In the exemplary embodiment, a CCITT Recommendation X.25 packet interface standard protocol is utilized as a protocol for data transmission/reception across the transmission medium.

Data, also referred to as data traffic, is typically synchronized utilizing one of: NRZI (non-return to zero inverted) code, and NRZ (non-return to zero) code.

FIG. 8, numeral 800, is a flow chart setting forth steps in accordance with the method of the present invention. The method provides steps for enabling secondary stations of at least a first and a second different communication network equipment type (NET) to transmit/receive data, wherein the data is arranged in message fields, on a same multi-drop transmission line operably coupled to the stations. The method comprises the steps of at least one of (A) and (B): (A) for transmitting, utilizing at least two virtual ports, wherein a virtual port is provided for each different NET: (1) each virtual port's utilizing a data link control protocol to receive corresponding at least first/second NET secondary station(s) data, to unify said data together with a first selected message field that identifies the NET, and to provide said unified data for polling (802), (2) polling data received from at least the first and the second virtual port and unifying said data in accordance with the identified NET for transmission (804), and (3) utilizing a layer one protocol unit to facilitate data conveyance (806); (B) for receiving, utilizing at least two virtual ports, wherein a virtual port is provided for each different NET: (1) utilizing a layer one protocol unit to facilitate data conveyance (808), (2) polling and sorting received data to an identified NET and passing said data to at least a first/second virtual port in accordance with the identified first/second NET (810), and (3) each virtual port's utilizing a data link control protocol to sort the received NET data in accordance with identified receiving at least first/second NET secondary station(s) and to provide said sorted data to the identified secondary station(s) utilizing further protocol layers (812).

As described above, data typically includes at least a first selected message field, generally selected to include a link address header for identifying a matched secondary station for the message, thus automatically identifying a network equipment type (NET). Also, the method substantially provides a layer 1-3 System Network Architecture/Open System Interconnection (SNA/OSI) protocol for the layered protocol communication network system and the protocol utilized typically provides for at least one of: synchronizing transmitted/received data, controlling a flow of multi-drop transmission/reception line data, and detecting and correcting data transmission errors.

In an exemplary embodiment of the method of the present invention, the first port may be selected to be of the first NET and to include a synchronous data link control (SDLC) packet assembler/disassembler (PAD) for passing data identified for the first NET to a matched SDLC data link secondary station and the second port may be selected to be of the second NET and to include a multi-point X.25 (MX.25) packet assembler/disassembler (MX.25 PAD), responsive to the polling means for passing data identified for the second NET to a matched MX.25 data link secondary station (X.25 compatible end-point equipment). In this embodiment, the first and second ports operate as described above, and protocol is utilized to transfer data across a transmission medium to the secondary stations, as described above.

Thus, in the exemplary embodiment, the first and the second ports may be selected to be ports that substantially comprise at least a first synchronous data link control telecommunications packet assembler/disassembler means (SDLC TPAD) and at least a first multi-point X.25 master packet assembler/disassembler means (MX.25 Master PAD), respectively, operably coupled to transmit/receive data in the network and existing within a multi-equipment routing master station as complete and independent virtual ports.

The present invention provides that, for each additional different network equipment type (NET) beyond the first and second NET types transmitted/received on one multi-drop transmission line, there is included at least a step for performing a data link control function for each additional different NET such that data for each said different NET may be transported across a transmission medium to a corresponding secondary station for that NET.

The method of the present invention may further include utilizing a layered protocol physical layer to transmit/receive data for the at least first and second NETs where said data is arranged in message fields, for example, having a bit-oriented protocol (BOP) for performing standard high level data link control (HDLC) handling of the data, utilizing a sequential protocol stack. In the exemplary embodiment of the method of the present invention, polling includes utilizing a first message field to provide a link address of the data to identify and route the data to a SDLC TPAD/MX.25 Master PAD. The exemplary embodiment further includes, for the SDLC TPAD, (1) a link control unit's (LCU's) managing the data flow, typically arranged according to a link level protocol, and providing said data to at least a first station control unit (SCU), (3) the SCUs's routing said data to a secondary station, and (4) utilizing a level 3 protocol for transferring data received from the SCU(s) (SDLC data) across a transmission medium identified by a message field (typically utilizing further protocol layers). The exemplary embodiment further includes, for the MX.25 Master PAD, (1) a level 2 port control unit's (LCU) managing data flow, typically arranged according to a link level protocol, and providing the said data to level station control unit(s) (SCU(s)), (2) the SCUs's routing said data to a secondary station identified by a message field (address header), and (3) utilizing a level 3 protocol for routing packets of data from the SCU(s) across a transmission medium.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A multi-equipment routing master station for facilitating digital data stream transmission/reception, comprising:

A) layer one (1) protocol means, coupled to receive/transmit data along a multi-drop transmission line, for facilitating data conveyance, B) polling means, coupled to transmit/receive data to/from the layer one protocol means, for utilizing at least a first selected message field to determine a network equipment type, NET, and for unifying/sorting data from/to at least first and second port means that are responsive to at least first and second NET secondary stations for respective NETs utilizing further protocol layers, C) the first port means, being responsive to the polling means and to further protocol layers for a first respective NET, for utilizing a first data link control protocol to unify/sort transmitted/received data from/to the first NET secondary station(s), and D) the second port means, coupled to the polling means and to further protocol layers for a second respective NET, for utilizing a second data link control protocol to unify/sort transmitted/received data from/to the second NET secondary station(s), wherein the digital data stream includes message fields, in a layered protocol communication network system having the multi-drop transmission line coupled to secondary stations of at least the first and the second NET, wherein each first selected message field includes a link address header for identifying a matched secondary station for the message such that a network equipment type (NET) is also automatically identified, wherein the first port means and the second port means substantially comprise at least a first synchronous data link control telecommunications packet assembler/disassembler means (SDLC TPAD) and at least a first multi-point X.25 master packet assembler/disassembler means (MX.25 Master PAD), respectively, operably coupled to transmit/receive data in the network and existing within the multi-equipment routing master station as complete and independent virtual ports, and E) further including that, where a layered protocol physical layer is operably coupled to transmit/receive data for the at least first and second NETs and said data is arranged in message fields, having a layer 1 protocol unit for performing standard high level data link control (HDLC) handling of the data, the multi-equipment routing master station utilizes a sequential protocol stack such that:

the polling means is operably coupled to receive data from the layered protocol physical layer and utilizes a first message field to provide a link address of the data to identify and route the data to one of: a SDLC TPAD and a MX.25 Master PAD, and further including, E1) for the SDLC TPAD,
link control unit means (LCU), operably coupled to the polling means to transmit/receive data for the first NET to/from the polling means, for managing link level data flow and providing said data to at least a first station control unit means (SCU), and the SCU means, operably coupled to transmit/receive data for the first NET to/from the LCU, for routing said data to a preselected secondary station, E2) for the MX.25 Master PAD,
level 2 port control unit (LCU) means, operably coupled to the polling means to transmit/receive the data for the second NET to/from the polling means, for managing link level data flow and providing the said data to level station control block (SCU) means, and the SCU means, operably coupled to transmit/receive data for the second NET to/from the LCU, for routing said data to a preselected secondary station, E3) a level 3 protocol is provided such that there is further provided:

E3a) for the SDLC TPAD,
SDLC transfer means, operably coupled to transmit/receive the data to/from the SCU means, for transferring SDLC data across a transmission medium, and E3b) for the MX.25 PAD,
X.25 transfer means, operably coupled to transmit/receive the data to/from the SCU means, for routing packets of said data traffic across a transmission medium.

2. The multi-equipment routing master station of claim 1 wherein the layer one (1) protocol means utilizes a physical protocol suitable for use on a multi-drop transmission line, and, where selected, the physical protocol is a bit-oriented protocol.

3. The multi-equipment routing master station of claim 1 wherein the first port means is of the first NET and includes a synchronous data link control (SDLC) packet assembler/disassembler (PAD), responsive to the polling means for passing data identified for the first NET to a matched SDLC data link secondary station.

4. The multi-equipment routing master station of claim 1 wherein the second port means is of the second NET and includes a multi-point X.25 (MX.25) packet assembler/disassembler (MX.25 PAD), responsive to the polling means for passing data identified for the second NET to a matched MX.25 data link secondary station.

5. The multi-equipment routing master station of claim 1 wherein the polling means, the first port means, and the second port means substantially provide a layer 1-3 System Network Architecture/Open System Interconnection (SNA/OSI) protocol for the layered protocol communication network system.

6. The multi-equipment routing master station of claim 1 wherein the protocol provides for at least one of:

A) synchronizing transmitted/received data,

B) controlling a flow of multi-drop transmission/reception line data, and

C) detecting and correcting data transmission errors.

7. The multi-equipment routing master station of claim 1 wherein each port means includes transmission protocol means for transferring data across a transmission medium to X.25 compatible end-point equipment.

8. The multi-equipment routing master station of claim 7 wherein the transmission protocol means utilizes one of:

A) an International Telegraph and Telephone Consultative Committee (CCITT) Recommendation X.25 packet interface standard protocol, and B) an SNA procedure for transferring SDLC data across a transmission medium.

9. The multi-equipment routing master station of claim 1 wherein, for each additional different network equipment type (NET) beyond the first and second NET types transmitted/received on one multi-drop transmission line, further including:

port means for each additional different NET, operably coupled to transmit/receive said NET, for at least performing a data link control function for the NET such that data for each said different NET may be transported across a transmission medium to at least a first secondary station.

10. The multi-equipment routing master station of claim 9 wherein the first secondary station is an X.25 secondary station (X.25 compatible end-point equipment).

11. The multi-equipment routing master station of claim 1 wherein each port means substantially comprises at least:

A) a link control unit, responsive to the polling means, for providing unification/sorting of data from/to at least a first station control unit, B) the station control unit(s) being responsive to the link control unit and at least a first level 3 data transfer unit, for facilitating data transfer from/to the link control unit to/from the first level 3 data transfer unit(s), and C) the level 3 data transfer unit(s) being responsive to the station control unit(s), for facilitating data transfer from/to the station control units(s) to/from a transmission medium.

12. The multi-equipment routing master station of claim 1 wherein the data traffic is synchronized and wherein a synchronizing protocol utilized by the layer one (1) protocol unit includes one of:

A) NRZI (non-return to zero inverted) code, and

B) NRZ (non-return to zero) code.

13. A method for enabling secondary stations of at least a first and a second different communication network equipment type (NET) to transmit/receive data, comprising the steps of at least one of (A) and (B):

A) for transmitting, utilizing at least two virtual ports, wherein a virtual port is provided for each different NET:

A1) each virtual port's utilizing a data link control protocol to receive corresponding at least first/second NET secondary station(s) data, to unify said data together with a first selected message field that identifies the NET, and to provide said unified data for polling, A2) polling data received from at least the first and the second virtual port and unifying said data in accordance with the identified NET for transmission, and A3) utilizing a layer one protocol unit to facilitate data conveyance, B) for receiving, utilizing at least two virtual ports, wherein a virtual port is provided for each different NET:

B1) utilizing a layer one protocol unit to facilitate data conveyance,

B2) polling and sorting received data to an identified NET and passing said data to at least a first/second virtual port in accordance with the identified first/second NET, and B3) each virtual port's utilizing a data link control protocol to sort the received NET data in accordance with identified receiving at least first/second NET secondary station(s) and to provide said sorted data to the identified secondary station(s), wherein the data in (A) and (B) is arranged in message fields, on a same multidrop transmission line coupled to the secondary stations of at least the first and the second different communication network equipment type (NET), wherein data includes at least a first selected message field having a link address header for identifying a matched secondary station for the message such that a network equipment type (NET) is also automatically identified, wherein the first and the second virtual ports substantially comprise at least a first synchronous data link control telecommunications packet assembler/disassembler means (SDLC TPAD) and at least a first multi-point X.25 master packet assembler/disassembler means (MX.25 Master PAD), respectively, operably coupled to transmit/receive data in the network and existing within a multi-equipment routing master station as complete and independent virtual ports, and C) further including utilizing a layered protocol physical layer to transmit/receive data for the at least first and second NETs where said data is arranged in message fields, having a layer one protocol unit for performing standard high level data link control (HDLC) handling of the data, utilizing a sequential protocol stack such that:

polling includes utilizing a first message field to provide a link address of the data to identify and route the data to a SDLC TPAD/MX.25 Master PAD, and further including, C1) for the SDLC TPAD, a link control unit's (LCU's) managing bit-oriented data flow and providing said data to at least a first station control unit (SCU), and the SCUs's routing said data to a secondary station identified by a message field (address header), C2) for the MX.25 Master PAD), a level 2 port control unit's (LCU's) managing bit-oriented data flow and providing the said data to level station control block (SCU(s)), and the SCUs's routing said data to a secondary station identified by a message field (address header), and C3) providing a level 3 protocol such that:

C3a) for the SDLC TPAD, transferring data received from the SCU unit(s) (SDLC data) across a transmission medium, and C3b) for the MX.25 PAD, routing packets of data from the SCU(s) across a transmission medium.

14. The method of claim 13 wherein the layer one protocol unit utilizes a physical protocol suitable for use on a multi-drop transmission line, and, where selected, the physical protocol is a bit-oriented protocol.

15. The method of claim 13 wherein the first port is of the first NET and includes a synchronous data link control (SDLC) packet assembler/disassembler (PAD) for passing data identified for the first NET to a matched SDLC data link secondary station.

16. The method of claim 13 wherein the second port is of the second NET and includes a multi-point X.25 (MX.25) packet assembler/disassembler (MX.25 PAD), responsive to the polling means for passing data identified for the second NET to a matched MX.25 data link secondary station.

17. The method of claim 13 wherein the method substantially provides a layer 1–3 System Network Architecture/Open System Interconnection (SNA/OSI) protocol for the layered protocol communication network system.

18. The method of claim 13 wherein the protocol provides for at least one of:

A) synchronizing transmitted/received data,

B) controlling a flow of multi-drop transmission/reception line data, and

C) detecting and correcting data transmission errors.

19. The method of claim 13 wherein transmission protocol provides for transferring data across a transmission medium to X.25 compatible end-point equipment.

20. The method of claim 19 wherein the transmission protocol utilizes one of:

A) an International Telegraph Consultative Committee (CCITT) Recommendation X.25 packet interface standard protocol, and B) an SNA procedure for transferring SDLC data across a transmission medium.

21. The method of claim 13 wherein, for each additional different network equipment type (NET) beyond the first and second NET types transmitted/received on one multi-drop transmission line, further including:

for each additional different NET, at least performing a data link control function for each additional different NET such that data for each said different NET may be transported across a transmission medium to at least a first matched secondary station.

22. The method of claim 21 wherein transmission protocol provides for transferring data across a transmission medium to X.25 compatible end-point equipment.

23. The method of claim 13 including synchronizing data and wherein a synchronizing protocol utilized by the layer one protocol unit includes one of:

A) NRZI (non-return to zero inverted) code, and

B) NRZ (non-return to zero) code.

* * * * *